(12) United States Patent
Ayzenberg et al.

(10) Patent No.: US 10,152,267 B1
(45) Date of Patent: Dec. 11, 2018

(54) REPLICATION DATA PULL

(71) Applicant: EMC Corporation, Hopkinton, MA (US)

(72) Inventors: Lev Ayzenberg, Petah Tikva (IL); Ran Goldschmidt, Herzeliya (IL); Assaf Natanzon, Tel Aviv (IL)

(73) Assignee: EMC CORPORATION, Hopkinton, MA (US)

( * ) Notice: Subject to any disclaimer, the term of this patent is extended or adjusted under 35 U.S.C. 154(b) by 62 days.

(21) Appl. No.: 15/085,135

(22) Filed: Mar. 30, 2016

(51) Int. Cl.
*G06F 12/00* (2006.01)
*G06F 3/06* (2006.01)
*G06F 12/0893* (2016.01)

(52) U.S. Cl.
CPC ............ *G06F 3/065* (2013.01); *G06F 3/0619* (2013.01); *G06F 3/0685* (2013.01); *G06F 12/0893* (2013.01); *G06F 2212/1032* (2013.01); *G06F 2212/60* (2013.01)

(58) Field of Classification Search
CPC .. G06F 11/1458; G06F 11/1471; G06F 3/065; G06F 12/0893; G06F 3/0619; G06F 2212/1032; G06G 2212/60
See application file for complete search history.

(56) References Cited

U.S. PATENT DOCUMENTS

| 5,170,480 | A | 12/1992 | Mohan et al. |
| 5,249,053 | A | 9/1993 | Jain |
| 5,388,254 | A | 2/1995 | Betz et al. |
| 5,499,367 | A | 3/1996 | Bamford et al. |
| 5,526,397 | A | 6/1996 | Lohman |
| 5,864,837 | A | 1/1999 | Maimone |
| 5,879,459 | A | 3/1999 | Gadgil et al. |
| 5,990,899 | A | 11/1999 | Whitten |
| 6,042,652 | A | 3/2000 | Hyun et al. |
| 6,065,018 | A | 5/2000 | Beier et al. |
| 6,143,659 | A | 11/2000 | Leem |
| 6,148,340 | A | 11/2000 | Bittinger et al. |
| 6,174,377 | B1 | 1/2001 | Doering et al. |
| 6,174,809 | B1 | 1/2001 | Kang et al. |
| 6,203,613 | B1 | 3/2001 | Gates et al. |
| 6,260,125 | B1 | 7/2001 | McDowell |
| 6,270,572 | B1 | 8/2001 | Kim et al. |
| 6,272,534 | B1 | 8/2001 | Guha |

(Continued)

FOREIGN PATENT DOCUMENTS

| EP | 1 154 356 | 11/2001 |
| WO | WO 00 45581 A3 | 8/2000 |

OTHER PUBLICATIONS

Gibson, "Five Point Plan Lies at the Heart of Compression Technology;" Tech Talk; Apr. 29, 1991; 1 Page.

(Continued)

*Primary Examiner* — Arvind Talukdar
(74) *Attorney, Agent, or Firm* — Daly, Crowley, Mofford & Durkee, LLP

(57) ABSTRACT

In one embodiment, a method includes intercepting a write command to write to a volume at a production site, saving data from the write command to a cache, sending metadata from the write command to a data protection appliance (DPA), writing the data to the volume, receiving a request for the data in the cache, sending the data from cache to a data protection appliance (DPA) at the production site and sending the data from the DPA to the replication site.

11 Claims, 8 Drawing Sheets

(56) References Cited

U.S. PATENT DOCUMENTS

| | | |
|---|---|---|
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 * | 1/2012 | Natanzon ............ G06F 11/2064 711/150 |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 * | 4/2013 | Natanzon ............ G06F 11/1471 711/161 |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,515,904 B1 * | 8/2013 | Dwyer, III ........ G06F 17/30194 707/609 |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |

(56) References Cited

U.S. PATENT DOCUMENTS

| | | | |
|---|---|---|---|
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0024963 A1* | 2/2004 | Talagala .............. G06F 11/1076 711/114 |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2008/0082770 A1* | 4/2008 | Ahal .................. G06F 11/1471 711/162 |
| 2013/0246354 A1* | 9/2013 | Clayton .............. G06F 11/2071 707/624 |

OTHER PUBLICATIONS

Soules et al., "Metadata Efficiency in Versioning File Systems;" 2$^{nd}$ USENIX Conference on File and Storage Technologies; Mar. 31, 2003-Apr. 2, 2003; 16 Pages.

AIX System Management Concepts: Operating Systems and Devices; Bull Electronics Angers; May 2000; 280 Pages.

Soules et al., "Metadata Efficiency in a Comprehensive Versioning File System;" May 2002; CMU-CS-02-145; School of Computer Science, Carnegie Mellon University; 33 Pages.

"Linux Filesystems," Sams Publishing; 2002; Chapter 1: Introduction to Filesystems pp. 17-22 and Chapter 3: Overview of Journaling Filesystems pp. 67-71; 12 Pages.

Bunyan et al., "Multiplexing in a BrightStor® ARCserve® Backup Release 11;" Mar. 2004; 4 Pages.

Marks, "Network Computing, 33;" Cover Story; Feb. 2, 2006; 8 Pages.

Hill, "Network Computing, NA;" Cover Story; Jun. 8, 2006; 9 Pages.

Microsoft Computer Dictionary, Fifth Edition; 2002; 3 Pages.

Wikipedia; Retrieved on Mar. 29, 2011 from http://en.wikipedia.org/wiki/DEFLATE: DEFLATE; 6 Pages.

Wikipedia; Retrieved on Mar. 29, 2011 from http://en.wikipedia.org/wiki/Huffman_coding: HUFFMAN CODING; 11 Pages.

Wikipedia; Retrieved on Mar. 29, 2011 from http:///en.wikipedia.org/wiki/LZ77: LZ77 and LZ78; 2 Pages.

U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

* cited by examiner

REPLICATION DATA PULL

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one embodiment, a method includes intercepting a write command to write to a volume at a production site, saving data from the write command to a cache, sending metadata from the write command to a data protection appliance (DPA), writing the data to the volume, receiving a request for the data in the cache, sending the data from cache to a data protection appliance (DPA) at the production site and sending the data from the DPA to the replication site.

In another embodiment, an apparatus includes electronic hardware circuitry configured to intercept a write command to write to a volume at a production site, save data from the write command to a cache, send metadata from the write command to a data protection appliance (DPA), write the data to the volume, receive a request for the data in the cache, send the data from cache to a data protection appliance (DPA) at the production site and send the data from the DPA to the replication site. In an embodiment, the circuitry includes at least one of a processor, a memory, a programmable logic device or a logic gate.

In a further embodiment, an article includes a non-transitory computer-readable medium that stores computer-executable instructions. In an embodiment, the instructions cause a machine to intercept a write command to write to a volume at a production site, save data from the write command to a cache, send metadata from the write command to a data protection appliance (DPA), write the data to the volume, receive a request for the data in the cache, send the data from cache to a data protection appliance (DPA) at the production site and send the data from the DPA to the replication site.

DETAILED DESCRIPTION

In some embodiments, the current disclosure may provide techniques for a replication site to pull replication data. In one particular example, data from a write (e.g., a write command and also known as a write I/O) may be pulled by the replication site and the metadata of the write may be pushed to the replication site. In one particular example, the replication site may pull the data when resources allow.

Figure 1:
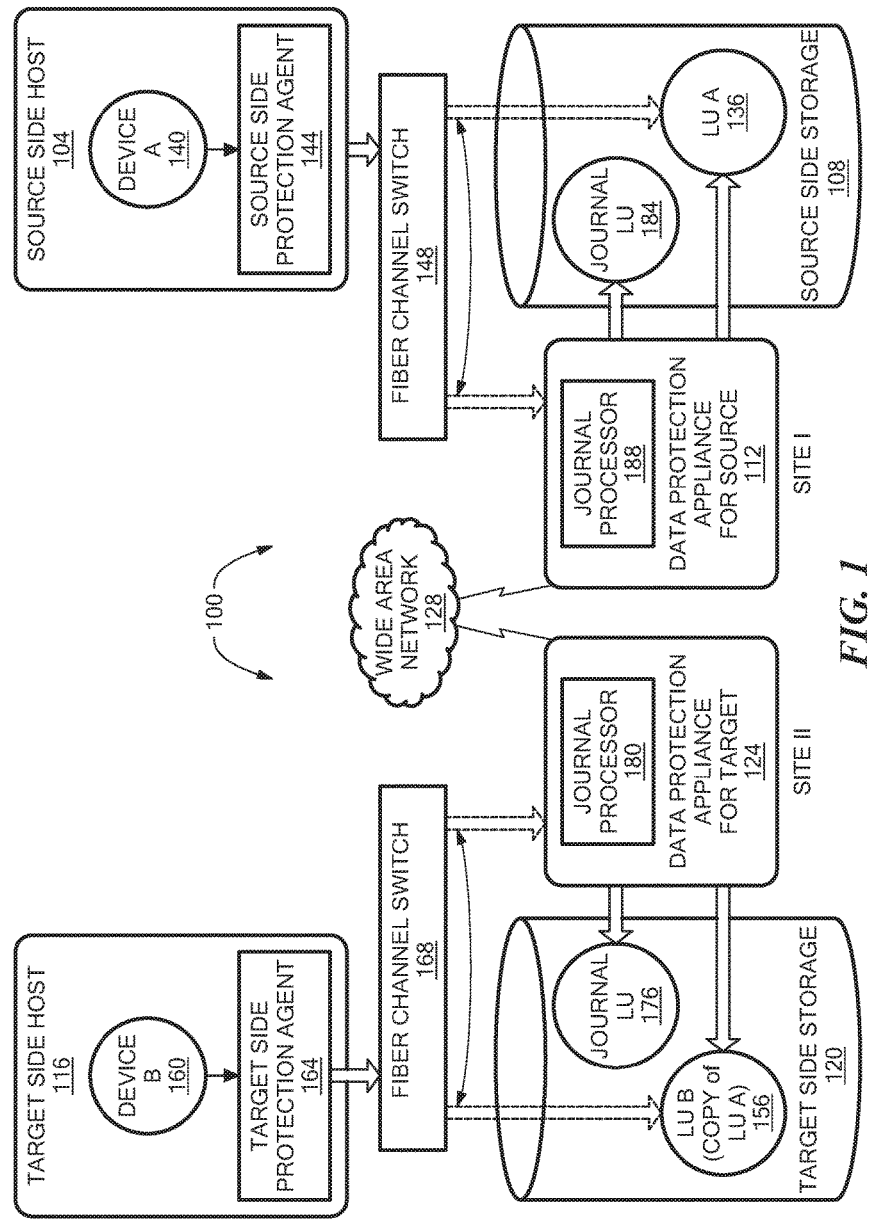
FIG. 1 is a block diagram of an example of a data protection system, according to one embodiment of the disclosure.

Referring to FIG. 1, according to one embodiment of the disclosure, a data protection system 100 may include two sites; Site I, which may be a production site, and Site II, which may be a backup site or replication site. Under normal operation the production site may be the source side of system 100, and the backup site may be the target side of the system. The backup site may be responsible for replicating production site data. The backup site may enable roll back of Site I data to an earlier point in time, which may be used in the event of data corruption of a disaster, or alternatively in order to view or to access data from an earlier point in time.

FIG. 1 is an overview of a physical or virtual system for data replication of either physical or virtual logical units. Thus, one of ordinary skill in the art would appreciate that in a virtual environment a hypervisor, in one example, may consume logical units and may generate a distributed file system on the logical units such as VMFS, for example, generates files in the file system and exposes the files as logical units to the virtual machines (each virtual machine disk is seen as a SCSI device by virtual hosts). In another example, the hypervisor may consume a network based file system and exposes files in the NFS as SCSI devices to virtual hosts.

In certain embodiments, during normal operations, the direction of replicate data flow may go from source side to target side. In other embodiments, it is possible, however, for a user to reverse the direction of replicate data flow, in which case Site I starts to behave as a target backup site, and Site II starts to behave as a source production site. In many embodiments, such change of replication direction is referred to as a "failover." In most embodiments, a failover may be performed in the event of a disaster at the production site, or for other reasons. In some data architectures in some embodiments, Site I or Site II may behave as a production site for a portion of stored data, and may behave simultaneously as a backup site for another portion of stored data. In some data architectures, a portion of stored data may be replicated to a backup site, and another portion may not.

In the example embodiment of FIG. 1, the production site and the backup site may be remote from one another, or they may both be situated at a common site, local to one another.

In this embodiment, local data protection may have the advantage of minimizing data lag between target and source, and remote data protection has the advantage of being robust in the event that a disaster occurs at the source side.

The source and target sides may communicate via a wide area network (WAN) 128, for example, although other types of networks may be used.

In one example, each side of system 100 may include three major components coupled via a storage area network (SAN); namely, (i) a storage system, (ii) a host computer, and (iii) a data protection appliance (DPA). Specifically, with reference to FIG. 1, the source side SAN may include a source host computer 104, a source storage system 108, and a source DPA 112. Similarly, in some embodiments, the target side SAN may include a target host computer 116, a target storage system 120, and a target DPA 124. As well, in many embodiments, the protection agent (sometimes referred to herein and in the art as a splitter) may run on the host, or on the storage, or in the network or at a hypervisor level, and that DPAs are optional and DPA code may run on the storage array too, or the DPA 124 may run as a virtual machine.

Generally, a SAN may include one or more devices, referred to as "nodes". A node in a SAN may be an "initiator" or a "target", or both. In certain embodiment, an initiator node may be a device that is able to initiate requests to one or more other devices; and a target node may be a device that is able to reply to requests, such as SCSI (small computer system interface) commands, sent by an initiator node. A SAN may also include network switches, such as fiber channel switches. In many embodiments, a communication links between each host computer and its corresponding storage system may be any appropriate medium suitable for data transfer, such as fiber communication channel links.

In most embodiment, a host communicates with its corresponding storage system using SCSI commands.

In the example embodiment of FIG. 1, System 100 may include source storage system 108 and target storage system 120. In this embodiment, each storage system may include physical storage units for storing data, such as disks or arrays of disks. Typically, storage systems 108 and 120 may be target nodes. In order to enable initiators to send requests to storage system 108, storage system 108 may expose one or more logical units (LU) to which commands are issued. Thus, storage systems 108 and 120 may be SAN entities that provide multiple logical units for access by multiple SAN initiators.

In some example embodiments, logical units may be a logical entity provided by a storage system, for accessing data stored in the storage system. In certain embodiments, the logical unit may be a physical logical unit or a virtual logical unit. In many embodiments, logical unit may be identified by a unique logical unit number (LUN). In the example embodiment of FIG. 1, Storage system 108 may expose a logical unit 136, designated as LU A, and storage system 120 may expose a logical unit 156, designated as LU B. As will be further described herein, the storage system 108 may include an application-consistent snapshot generator 122 configured to generate application-consistent snapshots.

In the example embodiment of FIG. 1, LU B may be used for replicating LU A. As such, LU B may be generated as a copy of LU A. In one embodiment, LU B may be configured so that its size is identical to the size of LU A. Thus, for LU A, storage system 120 may serve as a backup for source side storage system 108. Alternatively, as mentioned hereinabove, some logical units of storage system 120 may be used to back up logical units of storage system 108, and other logical units of storage system 120 may be used for other purposes. Moreover, there may be symmetric replication whereby some logical units of storage system 108 may be used for replicating logical units of storage system 120, and other logical units of storage system 120 may be used for replicating other logical units of storage system 108.

In the example embodiment of FIG. 1, System 100 may include a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally, a host computer may run at least one data processing application, such as a database application and an e-mail server.

Generally, an operating system of a host computer may generate a host device for each logical unit exposed by a storage system in the host computer SAN. In many embodiments, a host device may be a logical entity in a host computer, through which a host computer may access a logical unit. In the example embodiment of FIG. 1, Host device 104 may identify LU A and may generate a corresponding host device 140, designated as Device A, through which the host device 104 may access LU A. Similarly, in the example embodiment of FIG. 1, host computer 116 may identify LU B and may generate a corresponding device 160, designated as Device B.

In the course of continuous operation, host computer 104 may be a SAN initiator that issues I/O requests (write/read operations) through host device 140 to LU A using, for example, SCSI commands. Such requests may be generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); (e.g., 20 blocks). For an I/O rate of 50 megabytes (MB) per second, this corresponds to approximately 5,000 write transactions per second.

System 100 may include two data protection appliances, a source side DPA 112 and a target side DPA 124. A DPA may perform various data protection services, such as data replication of a storage system, and journaling of I/O requests issued by a host computer to source side storage system data. As explained in detail herein, when acting as a target side DPA, a DPA may also enable roll back of data to an earlier point-in-time (PIT), and processing of rolled back data at the target site. Each DPA 112 and 124 may be a computer that includes inter alia one or more conventional CPUs and internal memory.

For additional safety precaution, each DPA may be a cluster of such computers. Use of a cluster may ensure that if a DPA computer is down, then the DPA functionality switches over to another computer. The DPA computers within a DPA cluster may communicate with one another using at least one communication link suitable for data transfer via fiber channel or IP based protocols, or such other transfer protocol. One computer from the DPA cluster may serve as the DPA leader. The DPA cluster leader may coordinate between the computers in the cluster, and may also perform other tasks that require coordination between the computers, such as load balancing.

In the architecture illustrated in FIG. 1, DPA 112 and DPA 124 may be standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 may be configured to act as initiators in the SAN (e.g., DPAs may issue I/O requests using, for example, SCSI commands, to access logical units on their respective storage systems). DPA 112 and DPA 124 may also be configured with the necessary functionality to act as targets (e.g., to reply to I/O requests, such as SCSI commands, issued by other initiators in the SAN, including inter alia their respective host computers 104 and 116). Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In the example embodiment of FIG. 1, Host computer 104 and host computer 116 may include protection agents 144 and 164, respectively. Protection agents 144 and 164 intercept SCSI commands issued by their respective host computers, via host devices to logical units that are accessible to the host computers. A protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

In the example embodiment of FIG. 1, a protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, in the example embodiment of FIG. 1, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit. Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

In the example embodiment of FIG. 1, protection agents 144 and 164 may be drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In the example embodiment of FIG. 1, in production mode DPA 112 may act as a source site DPA for LU A. Thus, protection agent 144 may be configured to act as a source side protection agent (e.g., as a splitter for host device A). Specifically, protection agent 144 may replicate SCSI I/O write requests. A replicated SCSI I/O write request may be sent to DPA 112. After receiving an acknowledgement from DPA 124, protection agent 144 then may send the SCSI I/O write request to LU A. After receiving a second acknowledgement from storage system 108 host computer 104 may acknowledge that an I/O command complete.

When DPA 112 receives a replicated SCSI write request from protection agent 144, DPA 112 may transmit certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 may send each write transaction to DPA 124, may receive back an acknowledgement from DPA 124, and in turns may send an acknowledgement back to protection agent 144. Protection agent 144 may wait until receipt of such acknowledgement before sending the SCSI write request to LU A.

In asynchronous mode, DPA 112 may send an acknowledgement to protection agent 144 upon receipt of each I/O request, before receiving an acknowledgement back from DPA 124.

In snapshot mode, DPA 112 may receive several I/O requests and combines them into an aggregate "snapshot" of write activity performed in the multiple I/O requests, and may send the snapshot to DPA 124, for journaling and for incorporation in target storage system 120. In snapshot mode DPA 112 may send an acknowledgement to protection agent 144 upon receipt of each I/O request, before receiving an acknowledgement back from DPA 124.

While in production mode, DPA 124 may receive replicated data of LU A from DPA 112, and may perform journaling and writing to storage system 120. When applying write operations to storage system 120, DPA 124 may act as an initiator, and may send SCSI commands to LU B.

During a recovery mode, DPA 124 may undo the write transactions in the journal, so as to restore storage system 120 to the state it was at, at an earlier time.

As described hereinabove, LU B may be used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 may act as a target site protection agent for host Device B and may fail I/O requests sent from host computer 116 to LU B through host Device B.

Target storage system 120 may expose a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 may include a journal processor 180 for managing the journal LU 176.

Journal processor 180 functions generally to manage the journal entries of LU B. Specifically, journal processor 180 may enter write transactions received by DPA 124 from DPA 112 into the journal, by writing them into the journal LU, may read the undo information for the transaction from LU B, may update the journal entries in the journal LU with undo information, applies the journal transactions to LU B, and may remove already-applied transactions from the journal.

Figure 2:
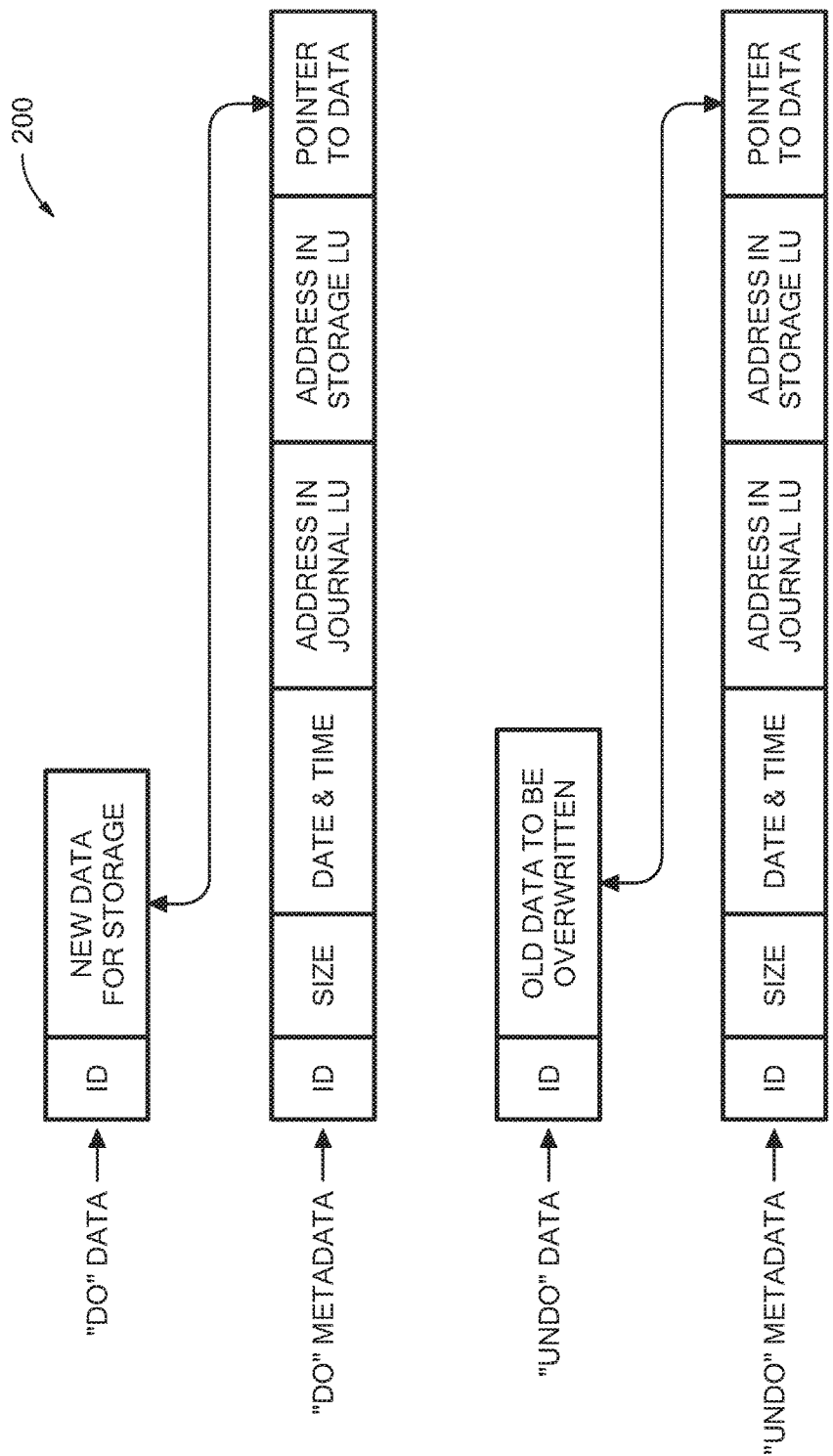
FIG. 2 is an illustration of an example of a journal history of write transactions for a storage system, according to one embodiment of the disclosure.

Referring to FIG. 2, which is an illustration of a write transaction 200 for a journal, in accordance to an embodiment of the current disclosure. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

In one example, a description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

In the example embodiment of FIG. 2, write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 may be transmitted from source side DPA 112 to target side DPA 124. As shown in FIG. 2, DPA 124 may record the write transaction 200 in the journal that includes four streams. A first stream, referred to as a DO stream, may include new data for writing in LU B. A second stream, referred to as an DO METADATA stream, may include metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, may include old data that was overwritten in LU B; and a fourth stream, referred to as an UNDO METADATA, may include an identifier, a date & time, a write size, a beginning address in LU B where data was to be overwritten, and a pointer to the offset in the UNDO stream where the corresponding old data is located.

In practice each of the four streams may hold a plurality of write transaction data. As write transactions are received dynamically by target DPA 124, the write transactions may be recorded at the end of the DO stream and the end of the DO METADATA stream, prior to committing the transaction. During transaction application, when the various write transactions are applied to LU B, prior to writing the new DO data into addresses within the storage system, the older data currently located in such addresses may be recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3A:
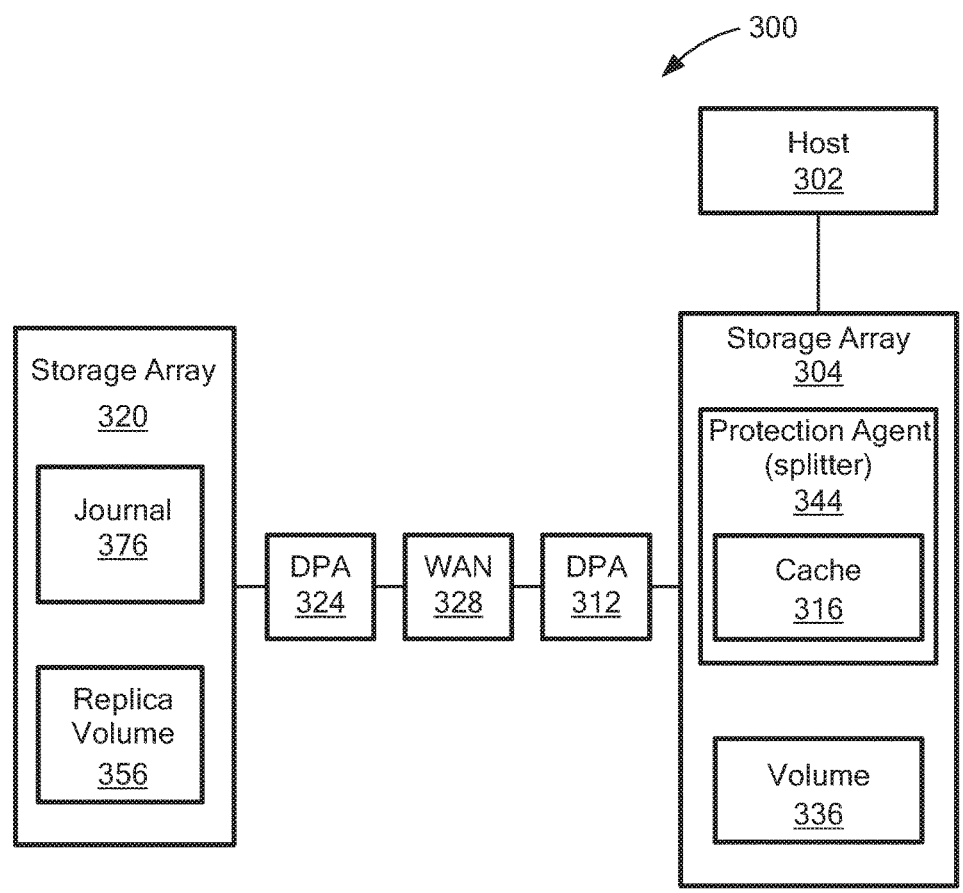
FIG. 3A is a simplified block diagram of an example of a data protection system configured to pull replication data, according to one embodiment of the disclosure.

Referring to FIG. 3A, a data protection system 300 is an example of a data protection system configured to pull replication data, according to one embodiment of the disclosure. In one example, a volume 336 is replicated to a replica volume 356. The system 300 may include a storage array 304, a DPA 312, a WAN 328, a DPA 324 and a storage array 320. The storage array 304 may include a protection agent 344 and the volume 336. The storage array 320 may include the replica volume 356 and a journal 376.

In one example, the DPAs 312, 324 may be similar to the DPA 112, 124. In one example, the journal 376 may be similar to the journal 176.

In one example, the protection agent 344 receives a write command and save the data from the write command to a cache 316 and sends the metadata to the DPA 312, for example. When the protection agent 344 receives a request for the data from the write command, the protection agent 344 sends the data from the cache 316.

In some examples, the protection agent 344 may not be able to write to the cache 316 because the cache 316 is full. In one particular example, if the cache 316 is full, writes to the cache 316 are delayed until there is a free space in the cache 316. In another particular example, if the cache 316 is full, the mode of the protection agent 344 is changed from the split mode to MOH (marking on host) mode and the metadata of the I/O (e.g., the volume offset and length of the I/O) are marked as dirty. In the MOH mode, the data is erased from the cache, and will be re-read from the storage so that continuous data protection is no longer possible as some I/O overwrites will be lost.

In the example embodiment of FIG. 3A, resynchronization may be performed later to move the data protection agent 344 to the split mode again. The cache 316 may be used during resynchronization and the data that did not have enough space may be read from the volume 336 directly. In a further particular example, if the cache 316 is full, a statistical process may be used to track "hot" locations (e.g., locations in the volume 336 that are over written more frequently relative to other locations in the volume 336) on the volume 336 so that the chances of a given write to have a successor write may be predicted for the same location. An existing write with lower chances to have a successor is tracked and replaced with a newer write. The process may be sustained until an amount of two different writes to the same location sums to the size of the cache 316. Replication may continue and data may be read in continuous mode as long as no I/O overwrites a previous I/O. Once an I/O is overwritten, the original location in cache is lost and any point-in-time protection is also lost. Concurrently, the DPA 312 pulls data free from the cache 316 and pulls the low successor writes data directly from the volume 336.

Figure 3B:
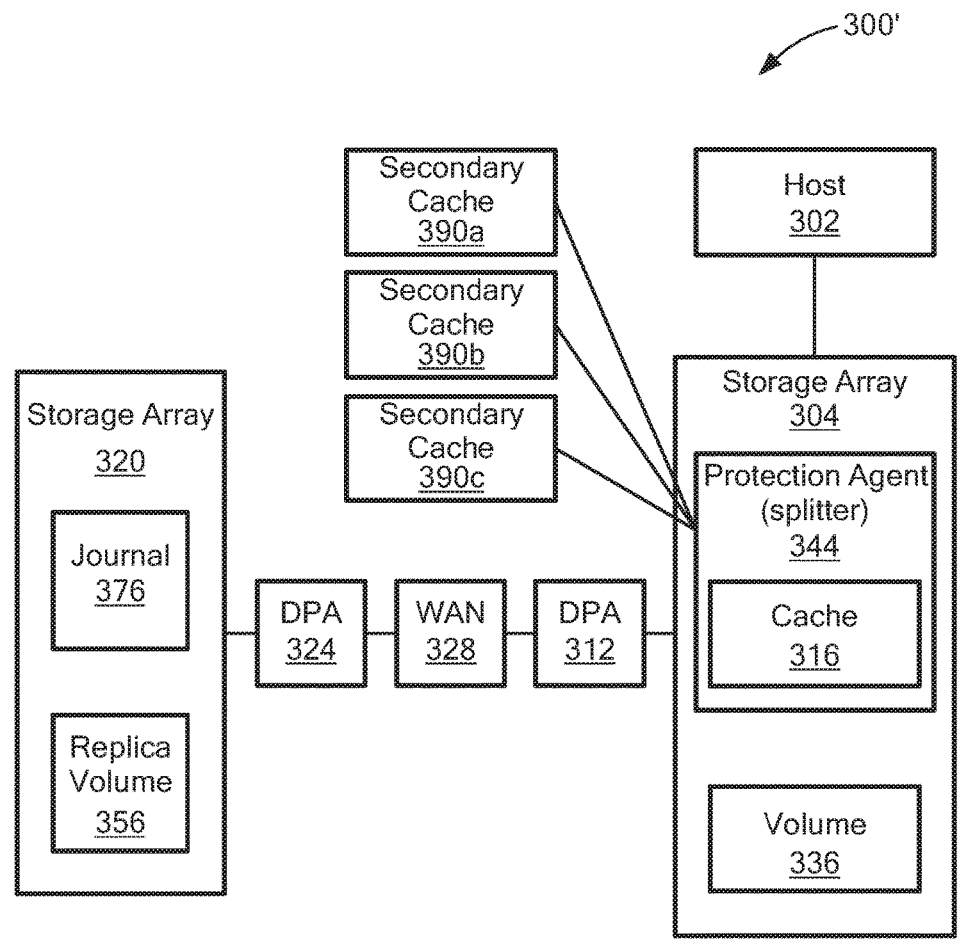
FIG. 3B is a simplified block diagram of another example of a data protection system configured to pull replication data, according to one embodiment of the disclosure.

Referring to FIG. 3B, a data protection system 300' is another example of a data protection system configured to pull replication data, according to one embodiment of the disclosure. The system 300' is similar to the system 300 except, for example, the system 300' may include secondary caches 390a-390c. In one example, if the cache 116 is full, the protection agent 344 may use the secondary caches 390a-390c. In one particular example, the caches 390-390c may be used in a round robin fashion. In the example embodiment of FIG. 3B, the data may be moved from the primary cache 116 to the secondary caches 390a-390c asynchronously without delaying the I/Os. Once the DPA 312 requests to send the data written to the volume 336 to the replica volume 356, the DPA 312 may read the data from the correct cache. In one particular example, metadata identifying which cache an I/O is stored may be stored at the protection agent 344.

Figure 4:
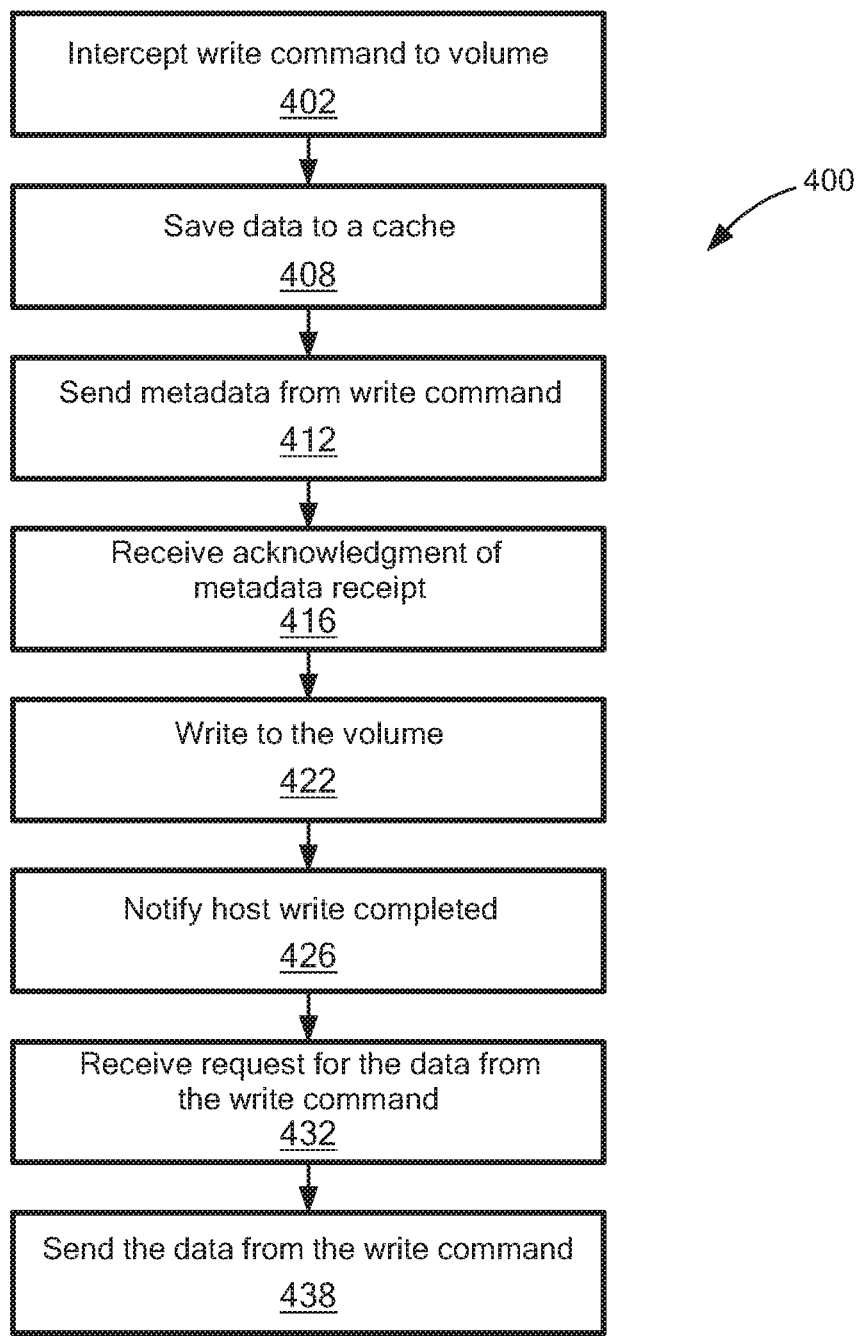
FIG. 4 is a flowchart of an example of a process to pull replication data, according to one embodiment of the disclosure.

Referring to FIG. 4, a process 400 is an example of a process to pull replication data, according to one embodiment of the disclosure. In one example, the process 400 may be performed by the protection agent 344.

Process 400 may intercept a write command to a volume (402). For example, the protection agent 344 may intercept a write command from the host 302 to write data to the volume 336.

Process 400 may save data to a cache (408). For example, the protection agent 344 may save the data from the write command to the cache 316.

Process 400 may send metadata from the write command (412). For example, the protection agent 344 may send metadata of the write command to the DPA 312.

Process 400 may receive an acknowledgment of receipt of the metadata (416). For example, the protection agent 344 may receive an acknowledgement from the DPA 312.

Process 400 may write data from the write command to the volume (422). For example, the protection agent 344 may write the data from the write command to the volume 336.

Process 400 may notify the host that the write command has completed (426). For example, the protection agent 344 notifies the host 302 that the write command to write data to the volume 336 has completed.

Process 400 may receive a request for the data in the write command (432) and process 400 sends the data in the write command from the cache (438). For example, the DPA 312 may send a request to the protection agent 344 to pull the data from the cache 316 and the protection agent 344 send the data from the cache 316.

In one example, processing blocks 432 and 438 may be performed at any time after processing block 412. In one particular example, processing blocks 432 and 438 may be performed after processing block 412 has completed, but before processing block 416 has commenced in synchronous replication. In some embodiments, the cache may be extended by external secondary caches 390-390c and as the cache 116 gets full, data may be sent to the secondary caches 390a-390c. When a request to pull the data is received, data is pulled from the correct cache.

Figure 5:
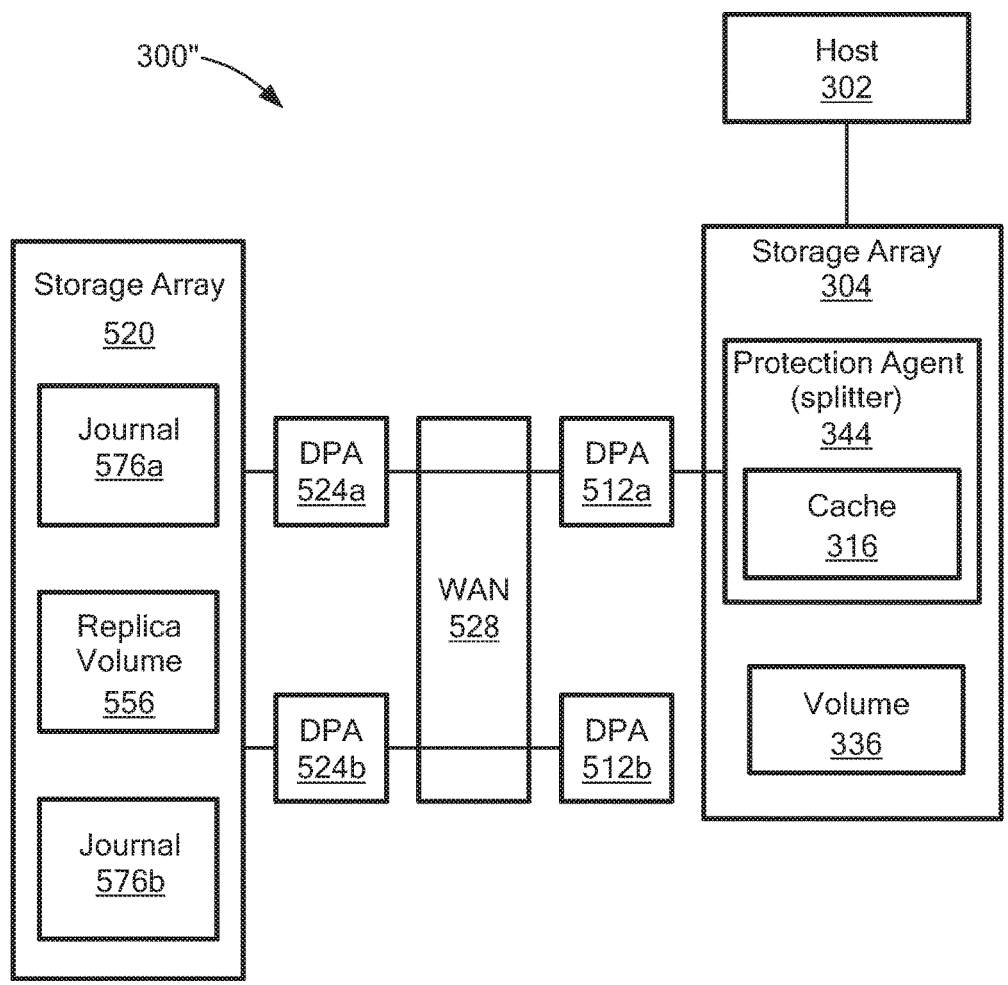
FIG. 5 is a simplified block diagram of a further example of a data protection system configured to pull replication data, according to one embodiment of the disclosure.

Referring to FIG. 5, a data protection system 300" is a further example of a data protection system configured to pull replication data, according to one embodiment of the disclosure. Similar to system 300, the system 300" may include the host 302 and the storage array 304, which includes the volume 336 and the protection agent 344 with the cache 316. The system 300" may further include DPAs 512a, 512b, a WAN 528, DPAs 524a, 524b and a storage array 520. The storage array 520 may include a replica volume 556 (e.g., a replica of volume 336), a journal 576a and a journal 576b.

In one particular example, the system 300" may include features and processes that are similar to approaches described in U.S. Pat. No. 8,478,955, issued Jul. 2, 2013, entitled "VIRTUALIZED CONSISTENCY GROUP USING MORE THAN ONE DATA PROTECTION APPLIANCE;" U.S. Pat. No. 8,433,869, issued Apr. 30, 2013, entitled "VIRTUALIZED CONSISTENCY GROUP USING AN ENHANCED SPLITTER;" and U.S. Pat. No. 8,832,399, issued Sep. 9, 2014, entitled "VIRTUALIZED CONSISTENCY GROUP USING AN ENHANCED SPLITTER," each of which are assigned to the same assignee as the present patent application. All applications in this paragraph are incorporated herein by reference in their entirety.

In one example, the DPA 512a may replicate half of the volume 336 to the replica volume 556 in a first consistency group and DPA 512b may replicate the other half of the volume 336 to replica volume 556 in a second consistency group. In the example embodiment of FIG. 5, the journal 576a may record I/Os received from the DPA 512a and the journal 576b may record I/Os received from the DPA 512b. In one particular example, the journals 576a, 576b are similar to the journal 176. In this example, the volume 336 may have activity which may be too high to be handled by a single DPA. In the example embodiment of FIG. 5, the address space of the volume is divided so that each portion of the volume is replicated by a different DPA. In the example embodiment of FIG. 5, in order to keep write order fidelity the I/O metadata flow through a single DPA, but the data is handled separately by all the DPAs.

In the example embodiment of FIG. 5, the data protection agent 344 may send the metadata of the write commands for the volume 336 to the DPA 512a. DPA 512a, divided the meta data and sends meta data for data which should be replicated by DPA 512b to DPA 512b. The DPAs 512a, 512b may later pull the data for the write commands and send the data to the storage array 520. The data flows to a single DPA reducing the overall load on each DPA.

Figure 6:
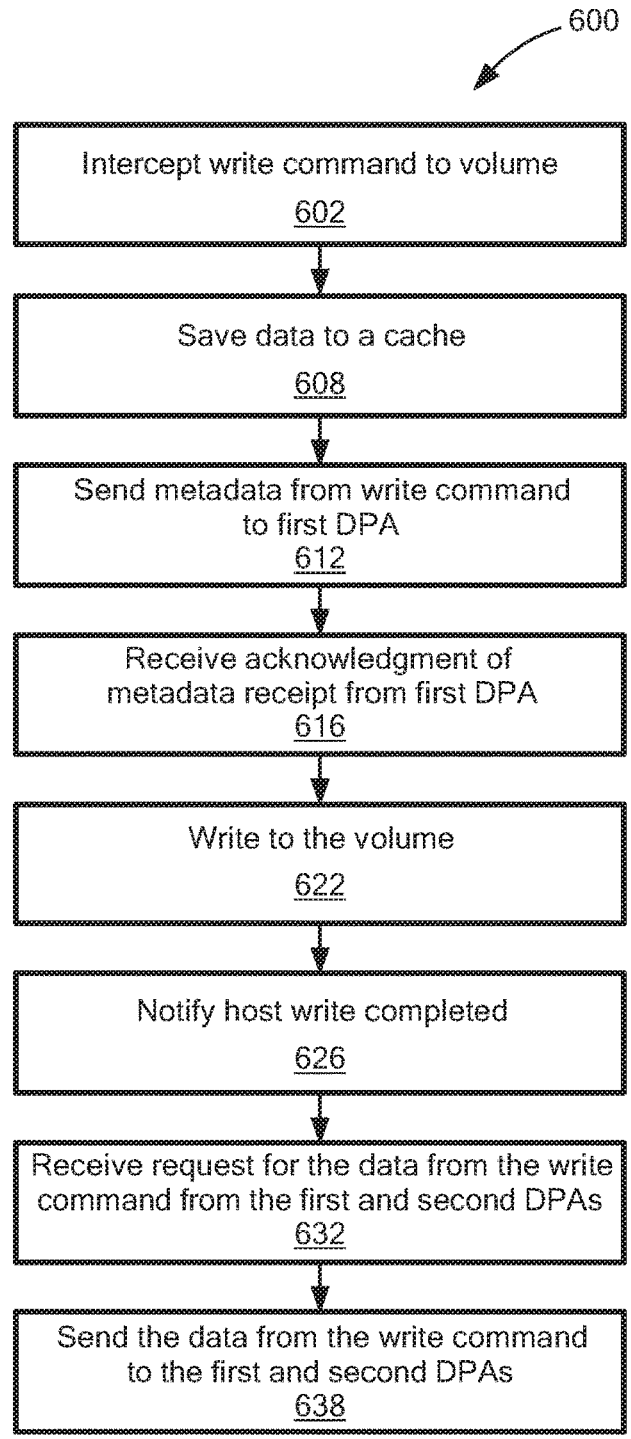
FIG. 6 is a flowchart of another example of a process to pull replication data, according to one embodiment of the disclosure.

Referring to FIG. 6, a process 600 is an example of a process to pull replication data in the system 300" (FIG. 5), according to one embodiment of the disclosure. In one example, the process 600 may be performed by the protection agent 344.

Process 600 may intercept a write command to a volume (602). For example, the protection agent 344 may intercept a write command from the host 302 to write data to the volume 336.

Process 600 may save data to a cache (408). For example, the protection agent 344 may save the data from the write command to the cache 316. In some embodiments the cache may be external to the storage.

In the example embodiment of FIG. 6, process 600 may send metadata from the write command to a first DPA (612). For example, the protection agent 344 may send metadata of the write command to the DPA 512a. In one example, the DPA 512a may notify the DPA 512b of relevant I/Os that DPA 512 is responsible for.

In the example embodiment of FIG. 6, process 600 may receive an acknowledgment of receipt of the metadata (616). For example, the protection agent 344 may receive an acknowledgement from the DPA 512a.

In the example embodiment of FIG. 6, process 600 may write data from the write command to the volume (622). For example, the protection agent 344 may write the data from the write command to the volume 336.

In the example embodiment of FIG. 6, process 600 may notify the host that the write command has completed (426). For example, the protection agent 344 notifies the host 302 that the write command to write data to the volume 336 has completed. In the example embodiment of FIG. 6, process 600 may receive a request for the data in the write command (432) and process 400 sends the data in the write command from the cache (438). For example, the DPAs 512a, 512b may separately send a request to the protection agent 344 to pull the data from the cache 316 and the protection agent 344 send the data from the cache 316 to the DPA 512a, 512b.

In one example, processing blocks 632 and 638 may be performed at any time after processing block 612. In one particular example, processing blocks 632 and 638 may be performed after processing block 612 has completed, but before processing block 616 has commenced in synchronous replication.

Figure 7:
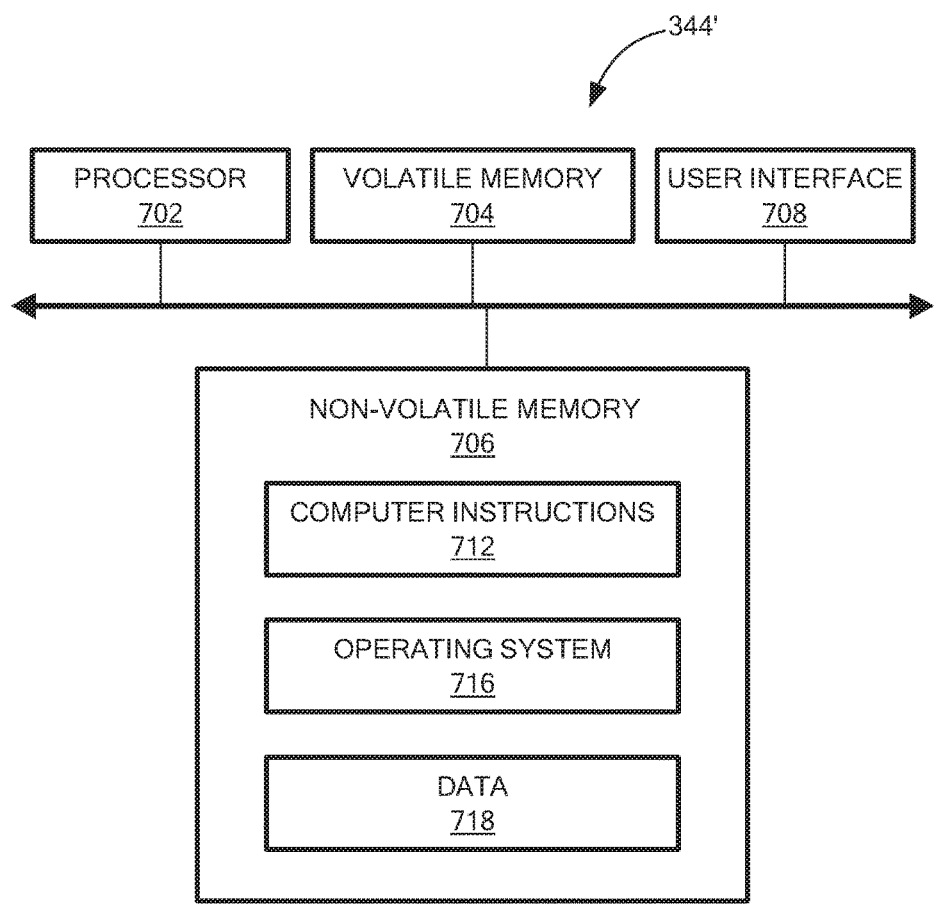
FIG. 7 is a computer on which any portion of the process of FIGS. 4 and 6 may be implemented, according to one embodiment of the disclosure.

Referring to the example embodiment of FIG. 7, in one example, the protection agent 344 may be the protection agent 344'. The protection agent 344' may include a processor 702, a volatile memory 704, a non-volatile memory 706 (e.g., hard disk, flash memory) and the user interface (UI) 708 (e.g., a graphical user interface, a mouse, a keyboard, a display, touch screen and so forth). The non-volatile memory 706 may store computer instructions 712, an operating system 716 and data 718. In one example, the computer instructions 712 may be executed by the processor 702 out of volatile memory 704 to perform at least a portion of the processes described herein (e.g., processes 400 and 600).

The processes described herein (e.g., processes 400 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400 and 600 are not limited to the specific processing order of FIGS. 4 and 6, respectively. Rather, any of the processing blocks of FIGS. 4 and 6 may be re-ordered, combined or removed, performed in parallel or in serial, as necessary, to achieve the results set forth above. In other examples, the cache 316 and the protection agent 344 may be located anywhere within the data protection system (e.g., data protection system 300, 300', 300") together or separately.

The processing blocks (for example, in the processes 400 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for use in a storage system including a first storage subsystem, a second storage subsystem, a first data protection appliance (DPA), and a plurality of second DPAs, the method comprising:
   intercepting, in the first storage subsystem, a write command associated with a data;
   saving the data to a cache of the first storage subsystem and writing the data to one or more volumes in the first storage subsystem;
   sending metadata for the write command from the first storage subsystem to the first a DPA, the metadata including at least one of an indication of a date associated with the data, an indication of a time associated with the data, an identifier associated with the data, an indication of an address associated with the data, and an indication of an offset associated with the data;
   sending a different respective portion of the metadata from the first DPA to each of the second DPAs;
   sending a different respective portion of the data from the cache of the first storage subsystem to each of the second DPAs,
   wherein the second DPAs are configured to store the respective portions of the data in the second storage subsystem, and
   wherein the respective portions of the data are sent to the second DPA after the metadata is sent to the first DPA.

2. The method of claim 1, further comprising:
   notifying a host that the data was written to the one or more volumes in the first storage subsystem.

3. The method of claim 1, wherein saving the data to a cache of the first storage subsystem comprises saving data to an external cache when an internal cache is full.

4. The method of claim 3, wherein the data is sent asynchronously to the external cache when the internal cache is full.

5. The method of claim 4, wherein the data is stored by the second DPAs in a distributed consistency group of the second storage subsystem.

6. A production system, comprising:

electronic hardware circuitry configured to:
- intercept a write command associated with a data;
- save the data to a cache and write the data to one or more volumes associated with the production system;
- send a different respective portion of metadata for the write command to each of a plurality of data protection appliances (DPAs) that are associated with a replication system, the respective portions of the metadata being sent to the DPAs that are associated with the replication system by using another DPA that is associated with the production system;
- send a different respective portion of the data to each of the plurality of DPAs that are associate with the replication system; and
- wherein the plurality of DPAs, that are associated with the replication system, are configured to store the respective portions of the data in the replication system;
- wherein the respective portions of the data are sent to the DPAs, that are associated with the replication system, after the metadata is sent to the other DPA that is associated with the production system, wherein
- the metadata includes at least one of an indication of a date associated with the data, an indication of a time associated with the data, an identifier associated with the data, an indication of an address associated with the data, and an indication of an offset associated with the data, and wherein the electronic hardware circuitry comprises at least one of a processor, a memory, a programmable logic device or a logic gate.

7. The production system of claim 6, further comprising circuitry configured to:
- notify a host that data was written to the one or more volumes.

8. The production system of claim 6, wherein the circuitry is configured to save data to a cache comprises circuitry configured to save data to an external cache when an internal cache is full, such that data is sent asynchronously to the external cache when the internal cache is full.

9. A non-transitory computer-readable medium that stores computer-executable instructions, which when executed by one or more processors cause the one or more processors to perform a method for use in a storage system including a first storage subsystem, a second storage subsystem, a first data protection appliance (DPA), and a plurality of second DPAs, the method comprising:
- intercepting, in the first storage subsystem, a write command associated with a data;
- saving the data to a cache of the first storage subsystem and writing the data to one or more volumes in the first storage subsystem;
- sending metadata for the write command from the first storage subsystem to the first DPA, the metadata including at least one of an indication of a date associated with the data, an indication of a time associated with the data, an identifier associated with the data, an indication of an address associated with the data, and an indication of an offset associated with the data;
- sending a different respective portion of the metadata from the first DPA to each of the second DPAs;
- sending a different respective portion of the data from the cache of the first storage subsystem to each of the second DPAs,
- wherein the second DPAs are configured to store the respective portions of the data in the second storage subsystem, and
- wherein the respective portions of the data are sent to the second DPA after the metadata is sent to the first DPA.

10. The non-transitory computer-readable medium of claim 9, wherein the method further comprises notifying a host that the data was written to the one or more volumes in the first storage subsystem.

11. The non-transitory computer-readable medium of claim 9, wherein saving the data to a cache of the first storage subsystem comprises saving data to an external cache when an internal cache is full.

* * * * *